Patented Dec. 23, 1924.

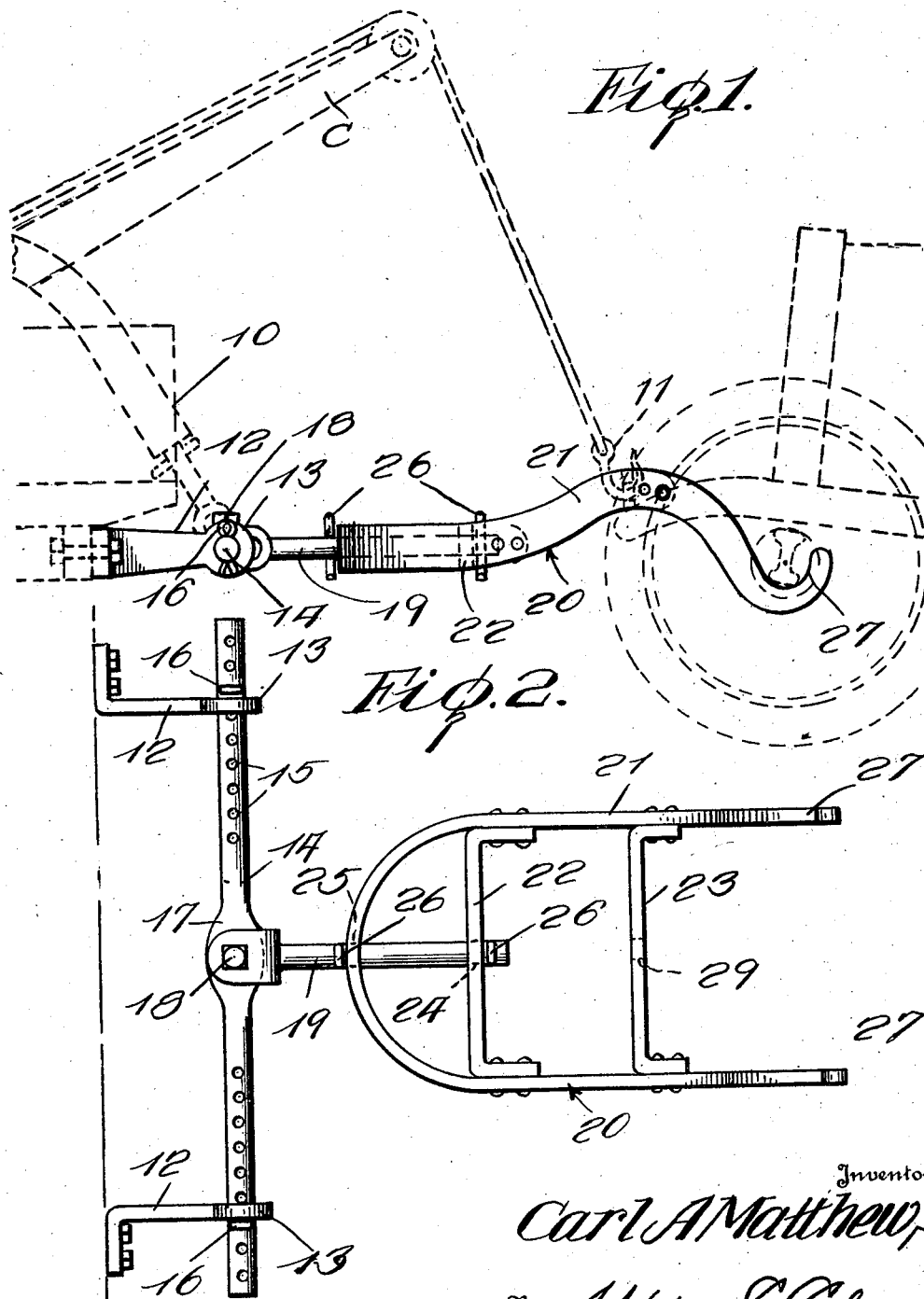

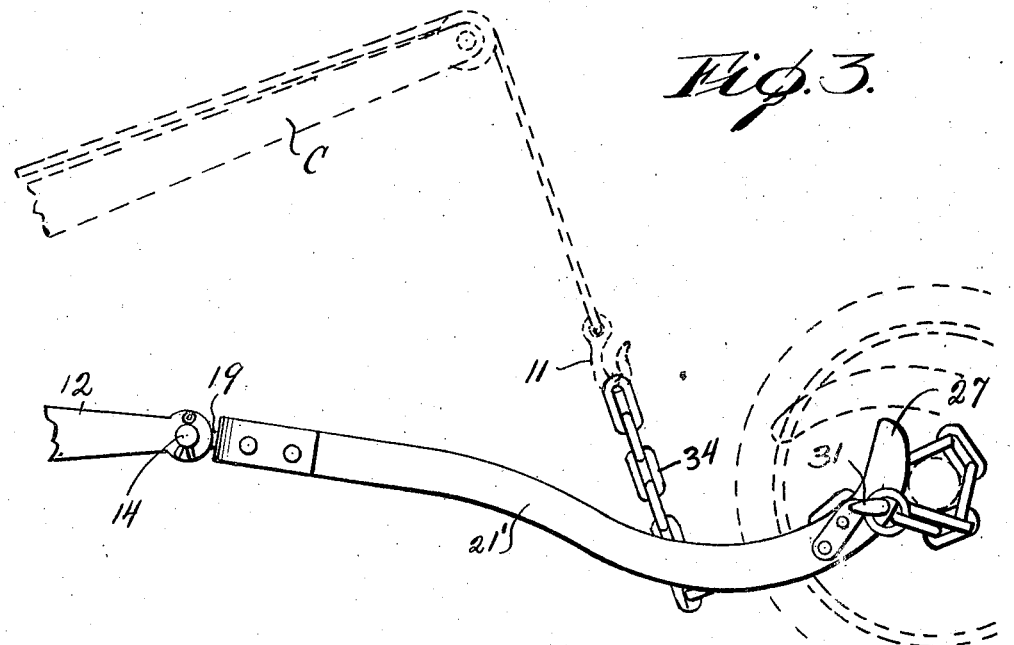
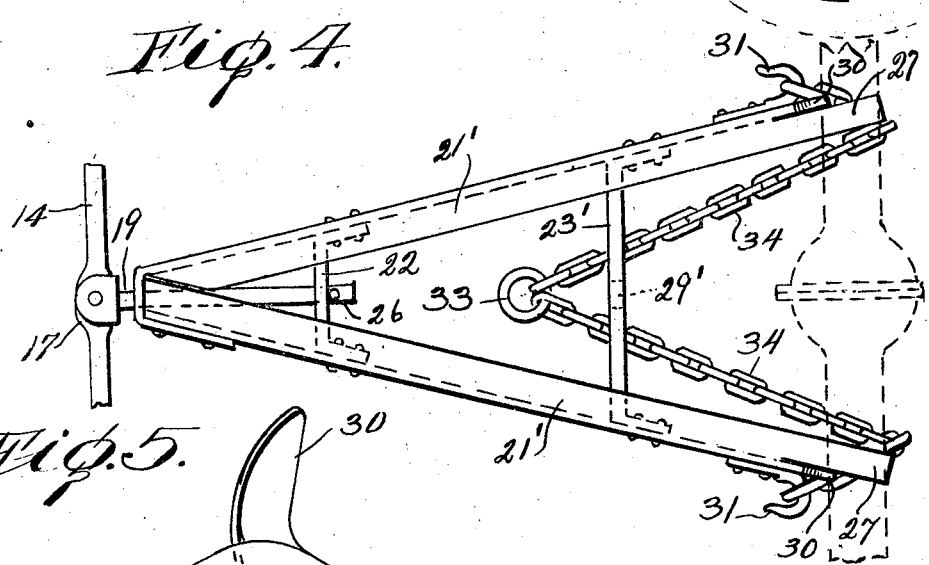
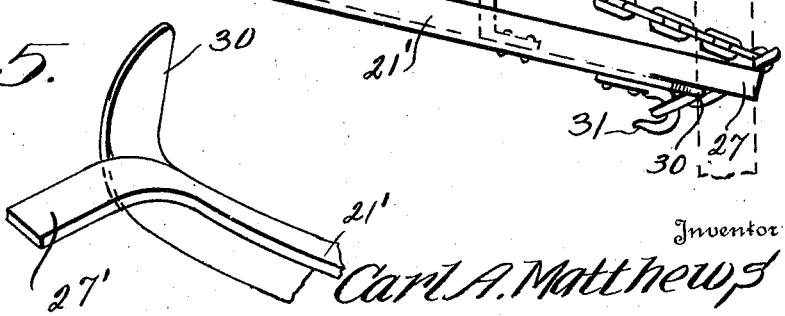

1,520,194

UNITED STATES PATENT OFFICE.

CARL A. MATTHEWS, OF NASHVILLE, TENNESSEE.

ATTACHMENT FOR WRECKERS.

Application filed October 1, 1923. Serial No. 666,027.

*To all whom it may concern:*

Be it known that I, CARL A. MATTHEWS, a citizen of the United States, residing at Nashville, in the county of Davidson and State of Tennessee, have invented certain new and useful Improvements in Attachments for Wreckers, of which the following is a specification, reference being had to the accompanying drawings.

This invention relates to attachments for wreckers and more particularly for an automobile wrecker or trouble car.

An important object of the invention is to provide means for attaching an automobile to the back of the wrecking car with either the forward or rear end thereof elevated, the attachment being such that a slight shifting movement of the attached vehicle is possible.

A further object of the invention is to provide a device of this character which may be very readily engaged with the vehicle to be moved and which when attached thereto will be substantially unremovable therefrom.

A still further object of the invention is to provide a device of this character which is simple in its construction and arrangement, which is readily applied to the wrecking car, and which will be durable and efficient in service.

These and other objects I attain by the construction shown in the accompanying drawings wherein for the purpose of illustration is shown a preferred embodiment of my invention and wherein:—

Figure 1 is a side elevation showing a wrecking attachment constructed in accordance with my invention, the wrecker and supported automobile being indicated in dotted lines;

Figure 2 is a plan view of the attachment removed;

Figure 3 is a view similar to that shown in Figure 1, but showing a slight modified structure; and Figure 4 is a fragmentary plan view of the structure shown in Figure 3.

Fig. 5 is a detail view of the rear end of the arms.

Referring now more particularly to the drawings, the numeral 10 indicates the rear end of a wrecking car, the car being provided with a crane C of any suitable description and which crane embodies the usual hoisting hook 11. Secured to the back of the frame 10 are a pair of horizontal and rearwardly extending arms or braces 12, each provided at its rear end with an eye 13 through which is rotatably directed one end of a transverse extending bar 14. The bar 14 is provided at each end thereof with a series of openings 15 selectively receiving a retainer pin 16 for governing the position of the bar with relation to the braces. The central portion of the bar 14 is flattened, as at 17, and has pivotally engaged therewith, as at 18, the forward end of a round rearwardly extending bar 19.

The numeral 20 indicates a hoisting yoke substantially U-shaped in form and having the arms 21 thereof connected at spaced points by transversely extending braces 22 and 23. The brace 22, which is arranged next adjacent the bight portion, has formed therein an opening 24 aligning with an opening 25 formed in the bight portion for the reception of the rear end of the rearwardly extending bar 19. Pins 26 are directed through the bar 19 forwardly of the bight portion and rearwardly of the braces 22, so that longitudinal movement of the bar with relation to the yoke is prevented and yet the yoke is rotatable upon the bar.

In the form of the invention shown in Figures 1 to 2, the free ends of the arms 21 of the yoke are bent downwardly and then upwardly to form hooks 27 for the reception of the front axle 28 of a disabled automobile. In this form of the invention the transverse member 23 is further provided with an opening 29 through which the hook 11 of the crane C may be directed.

In the form shown in Figures 3, 4 and 5, in which figures parts corresponding to similar parts in Figures 1 and 2 are indicated by the primes of the reference characters of these figures, the device is constructed by bending an angle iron to provide the arms 21'. At the rear ends of the arms the horizontal flange of the angle iron is bent to provide the hooks 27' while the vertical flanges thereof are bent upwardly to provide stop members 30. To each of the arms adjacent the rear ends thereof is secured a hook 31. In combination with this form of the device I preferably provide an attaching chain 32 consisting of a central eye 33 attached by lengths 34 of chain or cable with two smaller eyes 35. In use the small eyes are engaged with hooks 31 of the stop members and the ends of the chain passed over the axle and beneath the rear transverse member 23, after which the central eye is engaged with the hook 11 of the crane. By the use of this form of the device the pull upon the chains exerted by the crane serves to tighten the chains about the axle and to draw the axle into the angle formed between the stop members and the ends of the arms 21' of the yoke. This form of the device may further be provided in the cross member 23' thereof with the opening 29' for the reception of the hook thereby permitting the device to be employed as the first form of the device.

The bar 14 being rotatable in its mountings and the bar 19 having pivotal movement upon the bar 14 and having the yoke rotatable thereon, it will be obvious that the disabled machine being drawn may partake of all necessary movement to compensate for any inequalities of the ground over which it is passing without placing any undesirable strain upon the various parts of the device or upon the rear end of the wrecker. It will furthermore be obvious that a device of this character may be readily attached to the vehicle and being simply constructed may be cheaply produced and is not likely to get out of order. When not in use the device may be bodily removed from the machine or folded against the back of the machine, as indicated by the dotted lines in Figure 1. Many changes being possible in the various details of construction of the device as hereinbefore set forth without in any manner departing from the spirit of my invention I do not limit myself to such specific structure except as hereinafter claimed.

I claim:—

1. In a vehicle holding attachment for wreckers, a yoke provided at one end with means for attaching the same to the axle of a vehicle and to the hoist hook of a crane, and a connection between the opposite end of the yoke and the wrecker permitting universal movement of the yoke with respect to the wrecker, comprising spaced supports carried by the wrecker, a transverse bar rotatable in said supports, and a second bar pivoted at one end to the first named bar and having its opposite end rotatably directed through the forward end of the yoke.

2. In a vehicle holding attachment for wreckers, a yoke provided at one end with means for attaching the same to the axle of a vehicle and to the hoist hook of a crane, and a connection between the opposite end of the yoke and the wrecker permitting universal movement of the yoke with respect to the wrecker, said yoke being substantially U-shaped in form and having the bight portion thereof connected to the wrecker, the ends of the arms of the yoke being provided with hooks forming said means for attaching, stop members secured to the arms of the yoke adjacent the hooks thereof and flexible elements connected with said arms and adapted to be passed about the axle of the vehicle.

3. In a vehicle holding attachment for wreckers, a yoke provided at one end with means for attaching the same to the axle of a vehicle and to the hoist hook of a crane, and a connection between the opposite end of the yoke and the wrecker permitting universal movement of the yoke with respect to the wrecker, said yoke being substantially U-shaped in form and having the bight portion thereof connected to the wrecker, the ends of the arms of the yoke being provided with hooks forming said means for attaching, stop members secured to the arms of the yoke adjacent the hooks thereof and flexible elements connected with said arms adjacent the rear ends thereof and adapted to be passed about the axle of the vehicle, said arms being provided with hooks with which said flexible elements are engaged.

4. In a vehicle holding attachment for wreckers, a U-shaped yoke provided at the ends of the arms thereof with hooks for receiving the axle of a vehicle, spaced cross members connecting the arms of the vehicle and with one of which the hook of a crane is engageable, aligned openings formed in the bight portion of the yoke and the other cross member, a bar rotatable in said openings, and a connection between the forward end of the bar and the wrecker permitting vertical and horizontal oscillation of the yoke engaging end of said bar.

In testimony whereof I hereunto affix my signature.

CARL A. MATTHEWS.